3,780,087
GLYCOLATES FROM ACETALS
Jonathan Morris Kliegman, Charleston, and Robert Keith Barnes, South Charleston, W. Va., assignors to Union Carbide Corporation, New York, N.Y.
Filed Aug. 25, 1972, Ser. No. 283,743
Int. Cl. C07c 69/66
U.S. Cl. 260—468 K    8 Claims

ABSTRACT OF THE DISCLOSURE
Glycolates are produced by pyrolysis of the corresponding acetal of glyoxal in contact with a strong acid catalyst.

BACKGROUND OF THE INVENTION
Glycolates have been prepared in the past by the reaction of glycolic acid, or its esters or halide derivatives, with the corresponding appropriate alcohol. These known procedure have been very inefficient and expensive. In a limited manner, the glycolates have also been prepared by the hot tube pyrolysis of acetals at temperatures of about 300° C. or higher using cerium oxide as catalyst.

SUMMARY OF THE INVENTION
It has now been found that glycolates can be produced by the pyrolysis of an acetal of glyoxal at an elevated temperature of from about 125° C. to about 250° C., or higher, in the presence of a strong acid catalyst. The process of this invention can be carried out with the saturated aliphatic or cycloaliphatic acetals, the preferred are the acetals with alkoxy groups having easily removable alpha hydrogen atoms.

DESCRIPTION OF THE INVENTION
In the process of this invention any of the known acetals of glyoxal of the formula:

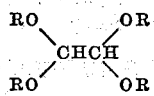

wherein R is alkyl of 1 to 20 carbon atoms or cycloalkyl of from 3 to 20 ring carbon atoms can be heated in the presence of a strong acid catalyst to yield the corresponding glycolate of the formula:

Among the alkyl groups one can mention methyl, ethyl, n-propyl, isopropyl, n-butyl, isobutyl, sec-butyl, n-amyl and various isomers thereof such as, for example, 1-methyl-butyl, 2-methyl-butyl, 1,2-dimethylpropyl, and 1-ethylpropyl and the corresponding straight and branched chain isomers of hexyl, heptyl, octyl, nonyl, decyl, undecyl, dodecyl, tridecyl, tetradecyl, pentadecyl, hexadecyl, heptadecyl, octadecyl, nonadecyl and eicosyl; among the cycloalkyl groups one can mention cyclopropyl, cyclobutyl, cycloamyl, cycloheptyl, cyclodecyl, methylcyclopentyl, ethylcyclopentyl, dimethylcyclohexyl, propylcyclobutyl and the like. These groups can be substituted with substituents which will not unduly interfere with the main reaction. When all of the R groups are methyl, some water must be present for conversion to the corresponding glycolate.

The strong acid catalyst is present in the reaction mixture at a concentration of from 0.001 to about 50 weight percent, preferably from about 0.005 to 10 weight percent based on the weight of acetal charged. Illustrative of suitable strong acid catalyst one can mention sulfuric acid, p-toluene-sulfonic acid, hydrochloric acid or any other acid having a pK value less than one.

The acetals are known compounuds and do not require extensive description herein. They can be prepared by the known method of reacting an alcohol with aqueous glyoxal by heating a solution thereof in an organic solvent in the presence of a catalyst at reflux temperature. As the reaction mixture is refluxed the water is removed azeotropically, then solvent and low boilers are removed at reduced pressure with the acetal remaining in the residue. The acetal is recovered with or without neutralization after cooling and purified by distillation or recrystallization.

The process of this invention is carried out at a temperature of from 125° C. to 250° C., preferably at the reflux temperature of the reaction mixture. The reaction can be carried out at subatmospheric, atmospheric, or superatmospheric pressure. While pressure is not critical for the satisfactory conductance of the process, the temperature should be about 125° C. or above.

The reaction is continued at the reflux temperature for a period of time sufficient for the reaction by-products to distill over with the water. This period will vary depending upon the size of the batch, the particular reactants, the temperature and the pressure and, therefore, no specific time range can be recited with certainty.

Illustrative of suitable acetals one can mention
1,1,2,2-tetrakis(methoxy)ethane,
1,1,2,2-tetrakis(ethoxy)ethane,
1,1,2,2-tetrakis(isopropoxy)ethane,
1,1,2,2-tetrakis(n-propoxy)ethane,
1,1,2,2-tetrakis(n-butoxy)ethane,
1,1,2,2-tetrakis(1-methylbutoxy)ethane,
1,1,2,2-tetrakis(2-butoxy)ethane,
1,1,2,2-tetrakis(pentoxy)ethane,
1,1,2,2-tetrakis(octoxy)ethane,
1,1,2,2-tetrakis(2-ethylhexoxy)ethane,
1,1,2,2-tetrakis(decoxy)ethane,
1,1,2,2-tetrakis(pentadecoxy)ethane,
1,1,2,2-tetrakis)cyclopropoxy)ethane,
1,1,2,2-tetrakis(cyclobutoxy)ethane,
1,1,2,2-tetrakis(cyclopentoxy)ethane,
1,1,2,2-tetrakis(methylcyclopentoxy)ethane,
1,1,2,2--tetrakis(dimethylcyclopentoxy)ethane,
1,1,2,2-tetrakis(ethylcyclopentoxy)ethane,
1,1,2,2-tetrakis(cyclohexoxy)ethane,
1,1,2,2-tetrakis(cycloheptoxy)ethane,
and the like.

The glycolates are useful as solvents, high temperature lubricants, and reflow solvents in paints such as automotive paints.

In a typical reaction the acetal and strong acid catalyst are heated at reflux, with the low boiling azeotrope of water and by-products removed azeotropically. The mixture reamining in the reaction, is cooled, neutralized, if desired, and fractionally distilled at reduced pressure to recover the purified glycolate.

The following examples serve to illustrate the invention, parts are by weight unless otherwise indicated.

EXAMPLE 1
A reactor was equipped with a stirrer, thermometer and a distillation column with a take-off head. There were added to the reactor 31.6 parts of 1,1,2,2-tetrakis-(2-butoxy)ethane and 0.2 part of p-toluenesulfonic acid and the mixture was heated at 200° C. to 250° C. for 2 hours while removing 4.3 parts of an azeotrope of water and organic by-products. The residue in the reactor was cooled, neutralized with 0.2 part of sodium bicarbonate. Analysis by vapor phase chromatography indicated the presence of 8.4 parts of 2-butyl, 2-butoxyacetate and 6.8 parts of 2-butanol as a by-product. Identity of the glycolate was established by gas liquid phase chromatographic analysis and mass spectroscopy.

EXAMPLE 2

In a manner similar to that described in Example 1, 34.6 parts of 1,1,2,2-tetrakis(cyclopentoxy)ethane and 0.2 part of p-toluenesulfonic acid were reacted at 125° C. to 150° C. for 2 hours while removing 6.2 parts of an azeotrope of water and by-products. The residue in the reactor was cooled, neutralized with 0.2 part of sodium bicarbonate and vacuum distilled. Analysis by vapor phase chromatography and mass spectroscopy established the presence of 17.4 parts of cyclopentyl cyclopentoxyacetate.

EXAMPLE 3

In a manner similar to that described in Example 1, 54.2 parts of 1,1,2,2-tetrakis(2-ethylhexoxy)ethane and 2 ml. of 96 percent sulfuric acid were reacted at 125° C. to 211° C. for 1.5 hours while removing an azeotrope of water and by-products. The residue in the reactor was cooled, neutralized with 5 parts of sodium bicarbonate and vacuum distilled. There were recovered 16.1 parts of 2-ethylhexyl 2-ethylhexoxyacetate at a pressure of one mm. of mercury at 126° C. to 130° C. having an $n_D^{25}$ of 1.4381. Microanalysis; calculated for $C_{18}H_{30}O_3$ (percent): C, 72.00, H, 12.00; found (percent): C, 72.10; H, 11.93.

EXAMPLE 4

In a manner similar to that described in Example 1, 32 parts of 1,1,2,2-tetrakis(butoxy)ethane and 1 ml. of 96 percent sulfuric acid were reacted at 90° C. to 225° C. for 1.2 hours while removing 9.7 parts of an azeotrope of water and by-products. The residue in the reactor was cooled, neutralized with 2.5 parts of sodium bicarbonate and vacuum distilled. There were recovered 15.6 parts of butyl butoxyacetate at a pressure of 5 mm. to 13 mm. of mercury at 105° C. to 112° C.

EXAMPLE 5

In a manner similar to that described in Example 1, 940 parts of 1,1,2,2-tetrakis(butoxy)ethane and 30 ml. of 96 percent sulfuric acid were reacted at 100° C. to 186° C. for 3 hours while removing 240.4 parts of an azeotrope of water and by-products. The residue in the reactor was cooled, neutralized with 50 parts of sodium bicarbonate and vacuum distilled. There were recovered 504 parts of butyl butoxy acetate at a pressure of 5 mm. to 20 mm. of mercury at 108° C. to 134° C.

EXAMPLE 6

In a manner similar to that described in Example 1, 42.4 parts of 1,1,2,2-tetrakis(cyclohexoxy) ethane and 0.4 part of 96 percent sulfuric acid were reacted at 100° C. to 182° C. for 1 hour while removing 13.3 parts of an azeotrope of water and by-products. The residue in the reactor was cooled, neutralized with 2 parts of sodium bicarbonate and vacuum distilled. There were recovered 16.2 parts of cyclohexyl cyclohexoxyacetate at a pressure of 1 mm. to 3 mm. of mercury at 102° C. to 134° C.

When the process of this invention was used to react 1,1,2,2-tetrakis(allyloxy)ethane or 1,1,2,2-tetrakis(benzyloxy)ethane, we were unable to isolate or identify any glycolate product.

We claim:
1. A process for the production of an alkyl or cycloalkyl glycolate which comprises reacting the corresponding acetal of glyoxal of the formula

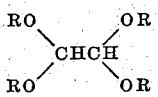

wherein R is alkyl of 1 to 20 carbon atoms or cycloalkyl of from 3 to 20 ring carbon atoms at temperature of from 125° C. to 250° C. while in contact with a strong acid catalyst having a pK value less than one.

2. A process as claimed in claim 1 wherein the catalyst is sulfuric acid.

3. A process as claimed in claim 1 wherein the catalyst is p-toluenesulfonic acid.

4. A process for producing 2-butyl 2-butoxyacetate as claimed in claim 1 wherein 1,1,2,2-tetrakis(2-butoxy) ethane is reacted in contact with said strong acid catalyst.

5. A process for producing cyclopentyl cyclopentoxyacetate as claimed in claim 1 wherein 1,1,2,2-tetrakis(cyclopentoxy)ethane is reacted in contact with said strong acid catalyst.

6. A process for producing 2-ethylhexyl 2-ethylhexoxyacetate as claimed in claim 1 wherein 1,1,2,2-tetrakis(2-ethylhexoxy) ethane is reacted in contact with said strong acid catalyst.

7. A process for producing butyl butoxyacetate as claimed in claim 1 wherein 1,1,2,2-tetrakis(cyclohexoxy) ethane is reacted in contact with said strong acid catalyst.

8. A process for producing cyclohexyl cyclohexoxyacetate as claimed in claim 1 wherein 1,1,2,2-tetrakis(cyclohexoxy)ethane is reacted in contact with said strong acid catalyst.

References Cited

UNITED STATES PATENTS

| 3,639,445 | 2/1972 | Pawloski | 260—484 R |
| 3,114,766 | 12/1963 | Knopf et al. | 260—484 R |

OTHER REFERENCES

| 923,341 | 7/1959 | Great Britain | 260—484 |

OTHER REFERENCES

Bagan and Kruger: Chem. Ber., 87, 1622 (1954).

LORRAINE A. WEINBERGER, Primary Examiner

P. J. KILLOS, Assistant Examiner

U.S. Cl. X.R.

260—484 R, 617 M, 631 R, 632 B